US008010491B2

(12) United States Patent
Edelstein et al.

(10) Patent No.: US 8,010,491 B2
(45) Date of Patent: Aug. 30, 2011

(54) METHOD FOR MANAGING MULTIPLE FILE STATES FOR REPLICATED FILES

(75) Inventors: Noah Edelstein, Seattle, WA (US); Lauren Antonoff, Seattle, WA (US); Hani Saliba, Seattle, WA (US); Hai Liu, Redmond, WA (US); Steven James Rayson, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 472 days.

(21) Appl. No.: 10/376,873

(22) Filed: Feb. 28, 2003

(65) Prior Publication Data
US 2004/0172424 A1   Sep. 2, 2004

(51) Int. Cl.
*G06F 7/00* (2006.01)
*G06F 17/00* (2006.01)

(52) U.S. Cl. .......... 707/638; 707/640; 707/695

(58) Field of Classification Search .......... 707/201, 707/203, 204, 1, 10, 8, 638, 609, 610, 640, 707/695; 717/170
See application file for complete search history.

(56) References Cited

U.S. PATENT DOCUMENTS

| | | | | |
|---|---|---|---|---|
| 5,278,979 A | * | 1/1994 | Foster et al. | 707/203 |
| 5,280,612 A | * | 1/1994 | Lorie et al. | 707/8 |
| 5,438,661 A | | 8/1995 | Ogawa | |
| 5,452,448 A | | 9/1995 | Sakurabe et al. | 395/600 |
| 5,630,116 A | * | 5/1997 | Takaya et al. | 707/201 |
| 5,694,596 A | | 12/1997 | Campbell | |
| 5,721,916 A | * | 2/1998 | Pardikar | 707/201 |
| 5,806,078 A | | 9/1998 | Hug et al. | |
| 5,835,911 A | | 11/1998 | Nakagawa et al. | |
| 5,881,292 A | | 3/1999 | Sigal et al. | |
| 5,937,405 A | | 8/1999 | Campbell | |
| 6,014,669 A | * | 1/2000 | Slaughter et al. | 707/10 |
| 6,041,333 A | | 3/2000 | Bretschneider et al. | |
| 6,067,551 A | * | 5/2000 | Brown et al. | 707/203 |
| 6,182,073 B1 | | 1/2001 | Kukkal | |

(Continued)

FOREIGN PATENT DOCUMENTS
EP   0 492 071 A2   7/1992
(Continued)

OTHER PUBLICATIONS http://ximbiot.com/cvs/manual/cvs-1.11.3/cvs.html, CVS—Concurrent Version System. Derek Robert Price. Dec. 27, 2002.*

(Continued)

*Primary Examiner* — John R. Cottingham
*Assistant Examiner* — Michael Pham
(74) *Attorney, Agent, or Firm* — Woodcock Washburn LLP

(57) ABSTRACT

A server file replication technique is implemented with three local copies of a replicated file. First, a shadow file is a copy of the last known good version of the file on the server. Second, a local copy is the user's working copy. Whatever changes the user has made to the file are stored in the local copy. Third, a rollback file is a copy made of the local copy if the local copy changes (for example, when conflicts are resolved or the server version is copied to the local copy.) Different states exist, based on whether these copies contain differences from each other and from the server version, and based on the user's use of the document. These states guide what is done to maintain the local copies and whether conflict resolution is required.

27 Claims, 5 Drawing Sheets

U.S. PATENT DOCUMENTS

| | | | |
|---|---|---|---|
| 6,256,773 B1 | | 7/2001 | Bowman-Amuah |
| 6,314,565 B1 | | 11/2001 | Kenner et al. |
| 6,324,544 B1 | | 11/2001 | Alam et al. |
| 6,324,554 B1 | | 11/2001 | Watanabe et al. |
| 6,341,291 B1 | | 1/2002 | Bentley et al. |
| 6,377,951 B1 | | 4/2002 | Campbell |
| 6,405,219 B2 | * | 6/2002 | Saether et al. ............... 707/201 |
| 6,449,624 B1 | | 9/2002 | Hammack et al. |
| 6,457,021 B1 | * | 9/2002 | Berkowitz et al. ............ 707/201 |
| 6,480,847 B1 | * | 11/2002 | Linenbach et al. ............... 707/8 |
| 6,493,732 B2 | | 12/2002 | Aoyama et al. |
| 6,513,084 B1 | | 1/2003 | Berkowitz et al. |
| 6,529,921 B1 | | 3/2003 | Berkowitz et al. |
| 6,532,591 B1 | | 3/2003 | Arai et al. |
| 6,560,655 B1 | | 5/2003 | Grambihler et al. |
| 6,598,059 B1 | * | 7/2003 | Vasudevan et al. ........... 707/203 |
| 6,651,249 B2 | | 11/2003 | Waldin et al. |
| 6,658,330 B2 | | 12/2003 | Delaruelle |
| 6,662,209 B2 | | 12/2003 | Potts et al. |
| 6,714,953 B2 | * | 3/2004 | Grubbs et al. ............... 707/205 |
| 6,757,893 B1 | * | 6/2004 | Haikin .......................... 717/170 |
| 6,804,663 B1 | | 10/2004 | Delo |
| 6,845,383 B1 | | 1/2005 | Kraenzel et al. |
| 6,865,591 B1 | * | 3/2005 | Garg et al. ..................... 709/201 |
| 7,076,778 B2 | | 7/2006 | Brodersen et al. |
| 7,350,191 B1 | | 3/2008 | Kompella et al. |
| 7,389,309 B2 | | 6/2008 | Edelstein et al. |
| 2001/0029517 A1 | * | 10/2001 | De Meno et al. ............ 709/101 |
| 2001/0042073 A1 | * | 11/2001 | Saether et al. ................ 707/203 |
| 2003/0009449 A1 | | 1/2003 | Grubbs et al. .................... 707/3 |
| 2003/0167318 A1 | | 9/2003 | Robbin et al. |
| 2004/0172425 A1 | * | 9/2004 | Edelstein et al. ............. 707/203 |

FOREIGN PATENT DOCUMENTS

| | | |
|---|---|---|
| EP | 0 713 183 A2 | 5/1996 |
| JP | 05241933 A   * | 9/1993 |
| JP | 2000284998 | 10/2000 |

OTHER PUBLICATIONS http://www.cotr.bc.ca/DocuShare/en-us/Help/manual/dsman.htm, Xerox Corporation. Copyright 1997-2000.*

Microsoft Developer Network Library Edition CD [Electronic resource], Microsoft Corporation. Apr. 1998.*

Microsoft Developer Network Library Edition CD [Electronic resource], Microsoft Corporation. Apr. 1998.*

Iguchi, Toshiaki. "File Maintaining System for Distributed Data Managing System". Sep. 1993. JP 05241933 A. (abstract, english).*

Balasubramaniam S. et. al. "What is a file synchronizer?", CSCI Technical Report, Apr. 22, 1998, pp. 1-21.*

MacVittie, L., "Version Control, with Integrity-MKS' Source Integrity VCS Stands Out for Its Comprehensive Platform Support, Ease of Management and Strong Security, but We'd Like . . . ", *Network Computing*, Oct. 15, 2001, 12(21), 69-80.

Spectrum SCM User Guide, SpectrumSCm™ Version 1.1, "Version Control and Source File Management", Jun. 2002, Chapter 8, 8-1-8-29.

Microsoft Visual SourceSafe, Reviewer's Guide, Version 5.0, http://www.microsoft.com/ssafe, 2001, 26 pages.

Balasubramaniam, S. et al., "What is a File Synchronizer", *CSCI Technical Report*, 1998, 1-21, XP-002263313.

Frank, L., "Evaluation of the Basic Remote Backup and Replication Methods for High Availability Databases", *Software-Practice and Experience*, 1999, 29(15), 1339-1353.

Ramsey, N. et al., "An Algebraic Approach to File Synchronization", *Software Engineering Notes, Assoc for Computing Machinery*, 2001, 26(5), 175-185, XP-002295139.

Norway Application No. 20040829: Norwegian Search Report, Jun. 2, 2010, 2 pages.

"Command Reference (A-L)", Rational Clear Case, Version 2002.05.00 and Later, Part No. 800-025071-000, Oct. 2001.

"Developing Software", Rational Clearcase, Version 2002.05.00 and Later, Part No. 800-025057-000, Oct. 2001.

Banzi et al., "An Experience in Configuration Management in Sodalia", System Configuration Management, 9th International Symposium, Lecture Notes in Computer Science, Jan. 1, 1999, 1675, 66-85.

Chan, F., "ClearCase—An Overview", Mar. 27, 1996, 6 pages.

Christoffel, J., "Bal—A Tool to Synchronize Document Collections Between Computers", System Administration Conference, Proceedings of the 11th USENIX Conference on System administration, San Diego, California, (no month available) 1997, 85-88.

Crnkovic et al., "Complex System Development Requirements—PDM and SCM Integration", Second Asia-Pacific Conference on Quality Software (APAQS'01), Dec. 10-11, 2001, 427-435.

Gaifullin et al., "Clear Case-Source Code Managing System", 10th international Crimean Microwave Conference "Microwave and Telecommunication Technology" Conference Proceedings (IEEE Cat No. 00EX415), 2000, 90-93.

Haake et al., "Take CoVer: Exploiting Version Support in Cooperative Systems", Conference on Human Factors in Computing Systems, Proceedings of the INTERACT '93 and CHI '93 Conference on Human Factors in Computing Systems, Amsterdam, The Netherlands, (no month available) 1993, 406-413.

Lee et al., "An integrated Approach to Distributed Version Management and Role-Based Access Control in Computer Supported Collaborative Writing", Journal of Systems and Software, Nov. 2001, 59(2), 119-134.

Osel et al., "Open Dist-Incremental Software Distribution", Ninth System Administration Conference (LISA '95), Monterey, California, Sep. 18-22, 1995, 181-193.

Siepmann, E., "A Data Management Interface as part of the Framework of an Integrated VLSI-Design System", Computer-Aided Design, ICCAD-89, Digest of Technical Papers, 1989 IEEE International Conference, Nov. 5-9, 1989, 284-287.

* cited by examiner

METHOD FOR MANAGING MULTIPLE FILE STATES FOR REPLICATED FILES

RELATED APPLICATIONS

This patent application relates to commonly assigned copending U.S. patent application Ser. No. 10/376,738, filed Feb. 28, 2003 and entitled "Managing File Replication in Applications."

FIELD OF THE INVENTION

This invention relates to the field of document management, and in particular to a method and system for managing multiple file states during the use of a file copied from a server.

BACKGROUND OF THE INVENTION

It is common practice in a networked computer environment for a computer user to collaborate on a document with another user on the network. Such a network may be a local area network (LAN), wide area network (WAN), the Internet or the like. In such a collaboration, each user may create and edit an electronic file by using a software application such as general application software, software designed specifically for the type of file that is the object of the collaboration, or the like.

A collaboration may be made possible by maintaining a master version of the electronic file in a location that is accessible to all users who will be collaborating on the file. In a conventional networked computer environment, there may exist a server computer and one or more user computers. The server is accessible to each user computer and therefore may store and control the master version of the file being collaborated on by the users.

When collaborating on an electronic file, a user accesses the file on the server. The user may then work on the file by altering the file in any way made available to the user by the application. For example, if the application is a word processor, spreadsheet, database, and/or the like, the application may provide means for performing tasks such as appending to, editing, copying, and/or deleting the file. At the completion of any alterations, the user may save changes to the version of the file stored on the server if the user wishes to retain such alterations to the file and has the requisite permissions.

While having a centrally-stored file is good for collaboration, requiring access to the server has a downside. A user must be connected to the server in order to access the server copy of the file. Replication engines are used to solve this problem. Such engines allow the user to have a local copy of the file on the server. This local copy allows the user to work with or view the file even when the server copy is not accessible. The replication engine manages the replication of the server state of the file to the user's local machine, giving the user offline access while attempting to maintain consistency between the server copy and the local copy.

This solution, however, has drawbacks, however, and such consistency is difficult or impossible to maintain using existing replication engines. The version of the file on the server computer may change while the user is not connected. For example, the version of the file on the server may be version A. This version A is copied to the user's computer by the replication engine. When the user is "offline" (disconnected from the server), the user edits the file, producing version B. Meanwhile, a second user edits the server copy of the file, creating version C. When the user again connects to the server, the user will have access to the user's current version (B) and the server version (C). Current replication engines provide only the ability to copy the user's version over the server version, in which case the second user's changes are lost, or to copy the server version over the user version. No information is available for the user regarding changes from version A. If the user synchronizes by saving version C and abandoning changes, version B will no longer be accessible to the user.

Because of these drawbacks, an improved way of managing replicated files from a server is desirable.

SUMMARY OF THE INVENTION

A server file replication technique is implemented which stores three copies of a replicated file. These three files allow improved conflict resolution for the user.

The shadow file is a copy of the last known good version of the file on the server. When the file is initially copied from the server, an extra copy is made to the shadow file. The shadow file is brought to the local machine to improve performance in synchronization and conflict management as well as afford an offline experience. The shadow file is updated from the server copy any time that a connection exists to the server and the server copy has changed from the version contained in the shadow copy. This is the only time this file is updated.

The local copy is the user's working copy. Whatever changes the user has made to the file are stored in the local copy. This local copy is used to update the server (in the case that the user's changes need to be pushed to the server) or to identify conflicts (when both the user's and the server versions have changed.)

A rollback file is also stored. This rollback file is a copy made of the local copy if the local copy changes (for example, when conflicts are resolved or the server version is copied to the local copy.) This copy ensures the ability to return the user to the last known copy that the user has seen.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary embodiments of the invention; however, the invention is not limited to the specific methods and instrumentalities disclosed. In the drawings.

DETAILED DESCRIPTION OF ILLUSTRATIVE EMBODIMENTS

Overview

A server file replication technique is implemented which stores three copies for each file on a server for while replication is in use. A local file stores is the user's working copy of the file. The shadow file is a copy of the last known good version of the server file (the version of the file on the server.) A rollback file stores a copy of the last local copy before a conflict resolution or replication has updated it.

When the file is initially copied from the server as the local copy, an extra copy is made to the shadow file. This is done in order to improve synchronization performance and implement conflict management.

When the user's computer is connected to the server, replication occurs. The shadow file is compared to the server version. If they are the same, then no update has been made to the server version of the file since the last synchronization. If they are not the same, the server version is copied to the shadow version. The local version is saved to rollback, and the shadow version is saved to the local version.

Versioning states track the state of changes to the local and server files. Information regarding versioning states and options for conflict management are provided to the user.

Exemplary Computing Device

Figure 1:
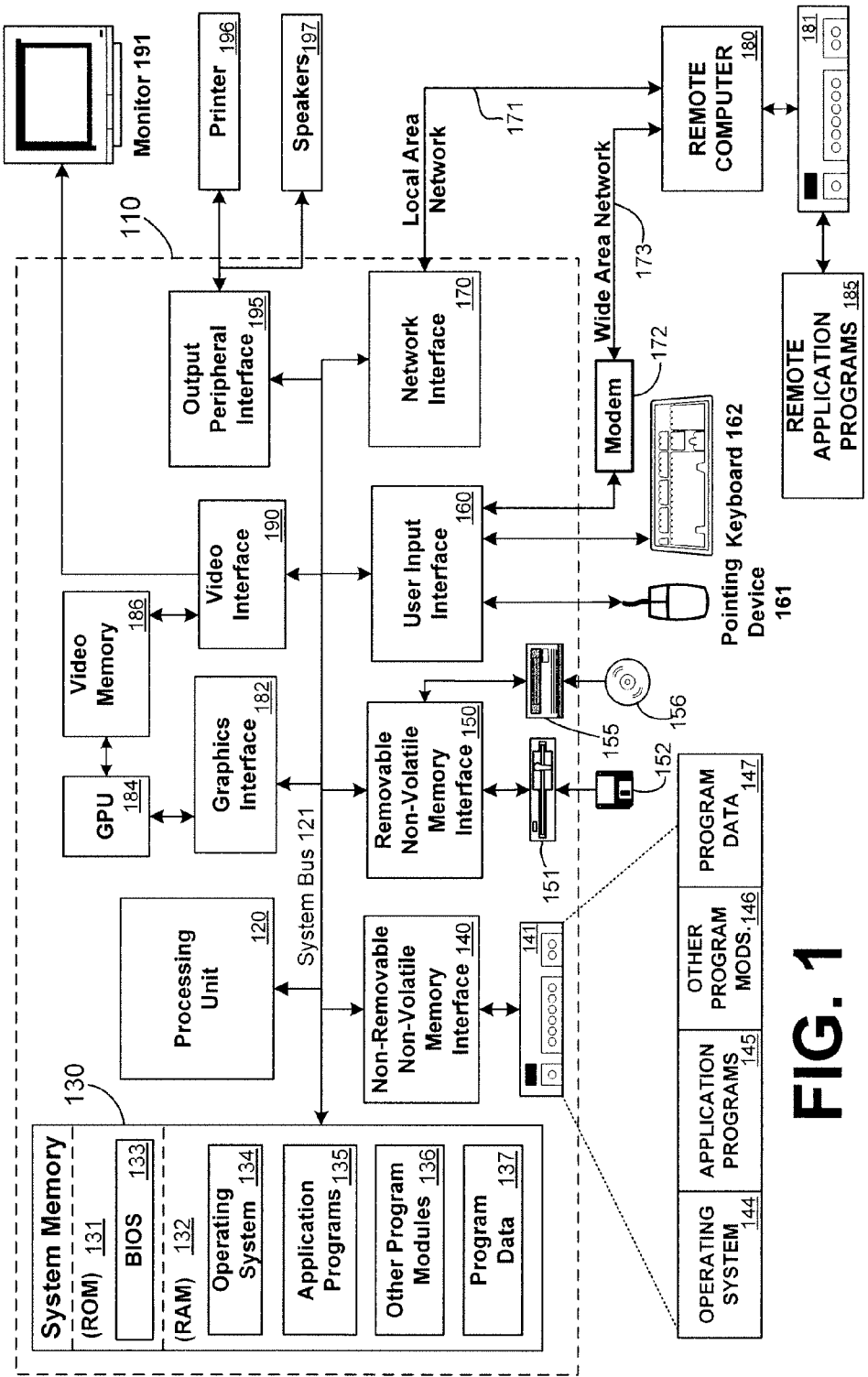
FIG. 1 is a block diagram showing an exemplary computing environment in which aspects of the invention may be implemented.

FIG. 1 and the following discussion are intended to provide a brief general description of a suitable computing environment in which the invention may be implemented. It should be understood, however, that handheld, portable and other computing devices and computing objects of all kinds are contemplated for use in connection with the present invention, as described above. Thus, while a general purpose computer is described below, this is but one example, and the present invention may be implemented with other computing devices, such as a thin client having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance, or other computing devices and objects as well. In essence, anywhere that data may be stored or from which data may be retrieved is a desirable, or suitable, environment for operation according to the invention.

Although not required, the invention can be implemented via an operating system, for use by a developer of services for a device or object, and/or included within application software that operates according to the invention. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like. The invention may also be practiced in distributed computing environments where tasks are performed by remote processing devices that are linked through a communications network/bus or other data transmission medium. In a distributed computing environment, program modules may be located in both local and remote computer storage media including memory storage devices, and client nodes may in turn behave as server nodes.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer system 110. Components of computer system 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer system 110 typically includes a variety of computer readable media. Computer readable media can be any available media that can be accessed by computer system 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, Random Access Memory (RAM), Read Only Memory (ROM), Electrically Erasable Programmable Read Only Memory (EEPROM), flash memory or other memory technology, Compact Disk Read Only Memory (CDROM), digital versatile disks (DVD) or other optical disk storage, magnetic cassettes, magnetic tape, magnetic disk storage or other magnetic storage devices, or any other medium which can be used to store the desired information and which can accessed by computer system 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer system 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer system 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer system 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer system 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of coprocessing devices may be included in computer system 110. A monitor 191 or other type of display device is also connected to the system bus 121 via an interface, such as a video interface 190, which may in turn communicate with video memory 186. In addition to monitor 191, computer systems may also include other peripheral output devices such as speakers 197 and printer 196, which may be connected through an output peripheral interface 195.

The computer system 110 may operate in a networked or distributed environment using logical connections to one or more remote computers, such as a remote computer 180. The remote computer 180 may be a personal computer, a server, a router, a network PC, a peer device or other common network node, and typically includes many or all of the elements described above relative to the computer system 110, although only a memory storage device 181 has been illustrated in FIG. 1. The logical connections depicted in FIG. 1 include a local area network (LAN) 171 and a wide area network (WAN) 173, but may also include other networks/buses. Such networking environments are commonplace in homes, offices, enterprise-wide computer networks, intranets and the Internet.

When used in a LAN networking environment, the computer system 110 is connected to the LAN 171 through a network interface or adapter 170. When used in a WAN networking environment, the computer system 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer system 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s .NET platform includes servers, building-block services, such as Web-based data storage and downloadable device software. While exemplary embodiments herein are described in connection with software residing on a computing device, one or more portions of the invention may also be implemented via an operating system, application programming interface (API) or a "middle man" object between any of a coprocessor, a display device and requesting object, such that operation according to the invention may be performed by, supported in or accessed via all of .NET's languages and services, and in other distributed computing frameworks as well.

Managing Multiple File States for Replicated Files Replication

Figure 2:
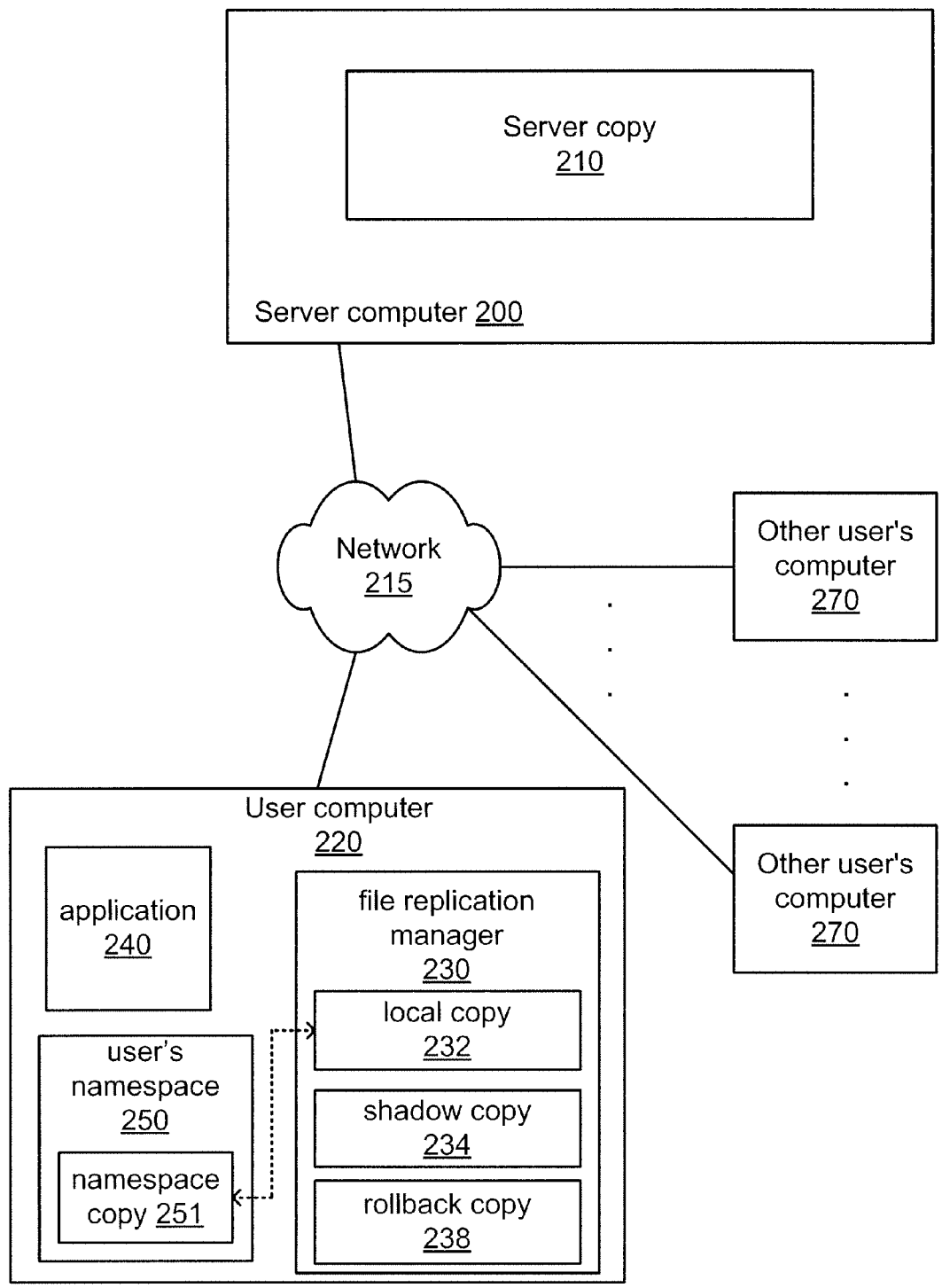
FIG. 2 is a functional diagram illustrating an example of a relationship between a server computer, a network, a user computer, and other computers.

With reference to FIG. 2, a server computer 200 is connected via network 215 to user computer 220. When the request is received by the server, the server allows the user computer 220 to open the file. File replication allows the user computer 220 to work, along with users on other user computers 270, on a local version of a server file. The authoritative version of the file is stored as server copy 210 on server computer 200. File replication manager 230 creates three copies of the file in user computer 220. These are the local copy 232, the shadow copy 234, and the rollback copy 238.

The local copy 232 is opened on the user computer 220 by an application 240. In one embodiment, there is a copy of the local copy 232 in the user's namespace 250 on user computer 220. In this embodiment, the local copy 232 tracks changes in a namespace copy 251 and the namespace copy 251 is used by application 240.

Where a namespace copy 251 is used, the namespace copy 251 isn't managed by the file replication manager 230. In this embodiment, the namespace copy 251 is a file that the user generally accesses. This file could be a file that they've created or a file that they've received via e-mail. Where the file is received via e-mail, the user receives an "always live attachment" (with server information) and save a copy to their local computer. Just the act of saving this file means that there are two copies, the one in the mail store and the one on the local machine. The local machine copy is the namespace copy 251. The server information in the attachment allows for file replication and the creation of the local copy 232, the shadow copy 234, and the rollback copy 238. Namespace copies are synchronized by the replication manager 220 with the local copy 232 when they are being used by a user.

The shadow copy 234 maintains the version of the server copy 210 last known to user computer 220. When the user computer 220 is connected to the server computer 200, the shadow copy 234 is the same as the server copy 210.

The rollback copy 238 stores the last known copy that the user has viewed or edited. When the local copy 232 has been overwritten in the replication process but the user wishes to return to the previous state, the rollback copy 238 is used to provide the last copy the user has read or edited.

The file replication manager 230 may be separate from the application 240, as shown, or it may be integrated into application 240. In either case, messages and information for the user from the file replication manager, and user interfaces collecting user input and displaying messages for the user may be integrated into the display presented to the user application 240. Information presented to the user regarding changes made between two version of a file (further described below) may also be presented using the display of application 240. Additionally, the production of such information for display to the user may utilize functionality of application 240.

Versioning States

The action of the file replication techniques according to one embodiment of the invention can be understood by reference to versioning states. For each replicated document, a versioning state describes what is occurring with the document at user computer 220. These versioning states are based on previous versioning states and the actions occurring in the local copy 232, the shadow copy 234, and the server copy 210 (the master copy of the document).

The first state is "current". The versioning state is current when the local copy 232 is the same as shadow copy 234. For example, when a file which is saved on user computer 220 is uploaded to server computer 200 for collaboration, the local copy 232 is the same as shadow copy 234. Similarly, when a file on server computer 200 is first replicated to user computer 220, the local copy is equal to shadow copy 234. As shown in the state diagram of FIG. 3, when a change is made to the local copy 232, so that it is no longer the same as shadow copy 234, the state transitions from "current" state 300 to "modified" state 310. When this modification is pushed up to the server or abandoned, so that the local copy 232 is again equal to the shadow copy 234, then the state returns to "current" state 300.

When the user computer 220 is connected to server computer 200 and notes that the server copy 210 has been updated, a copy of the new server copy 210 is made to shadow copy 234. The local copy 232 is saved as rollback copy 238, and the shadow copy 234 is then copied to local copy 232. In one embodiment, the last copy viewed by the user is tracked. Thus, if the user has viewed version A, and version B is downloaded from the server, the rollback will be a copy of version A. But if version C now is downloaded from the server, the rollback will not be changed to version B unless version B has been accessed by the user. Thus the rollback holds the last version looked at by the user.

Figure 3:
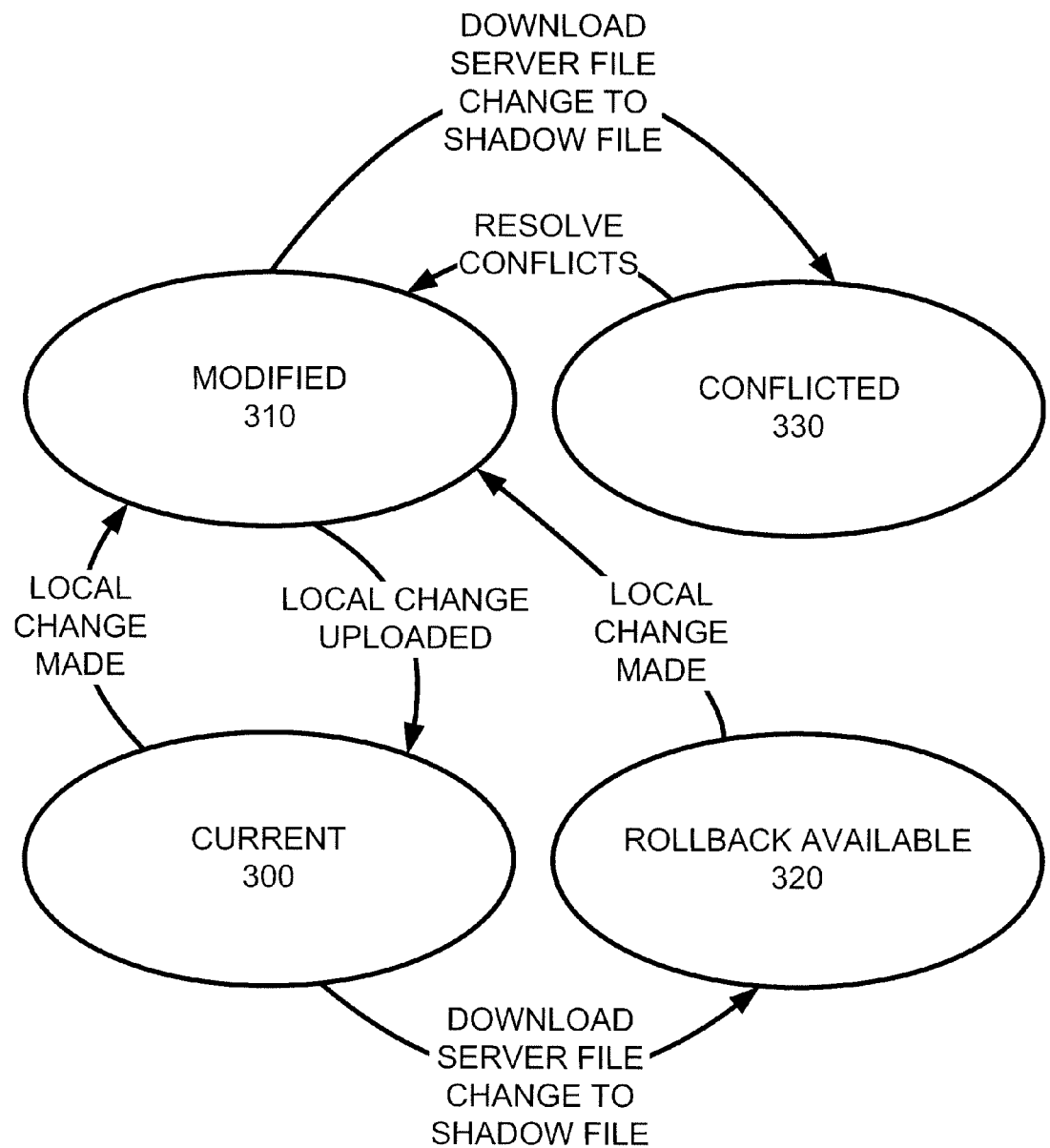
FIG. 3 is a state diagram showing state transitions in accordance with one embodiment of the present invention.

As seen in FIG. 3, if a server file change is downloaded to the shadow file and a rollback copy is stored, and the state is "current" state 300, the new state will be "rollback available" 320. If, however, this occurs in "modified" state 310, then there have been both local changes to the a previous version of the server copy, which are saved in the local copy 232, and some other changes (from other users) resulting in a new version of the server copy 210. This results in the "conflicted" state 330.

When a "conflicted" state 330 occurs, a resolution of the two possibly divergent sets of changes in local copy 232 and shadow copy 234 must occur. For example, the user could choose to abandon changes which had been made in local copy 232 or to overwrite the changes. The file resulting from this resolution is stored as local copy 232, and the state returns to "modified." As noted previously, when the changes in local copy 232 are pushed up to the server or abandoned in favor of the current server copy, the state is changed to "current."

Uploading Changes to the Server

In each of the versioning states, synchronization options are available to a user. These options may be separately available from the file replication manager 230 or may be integrated into application 240. If changes have been made, uploading (or "pushing") the changes to the server copy 210 is one option. This synchronization option allows the user to connect to the server computer 200 (if a connection is available) and synchronize the local copy 232 with the server copy 210.

If the versioning state is current 300 or rollback available 320, then no modifications have been made, and so no file is pushed to the server. If the versioning state is the modified state 310, the differences between the local copy 232 and the shadow copy 234 are determined. This process is known as "generating a diff" (for difference) of the two files. If the versioning state was modified state 310, the shadow copy 234 is the same as the server copy 210 (otherwise the versioning state would be conflicted state 330). Therefore the entire file does not need to be uploaded to the server—a file which includes all information regarding differences between the local copy 232 and shadow copy 234 contains all necessary information. This diff file is used by server computer 200 to update the server copy 210. Once the server copy 210 is updated, it should be copied to the shadow copy 234 and the versioning state changed appropriately.

The generation of the diff file may be done off-line. The user may decide to request synchronization at a time when the server computer 200 is not reachable from the user computer 220. If this happens, then the diff may be created and the action queued so that next time the server computer 200 is accessible, the uploading process may continue.

If the versioning state is conflicted state 330, then a conflict user interface must be begun. This conflict user interface should allow the user to resolve the differences between the local copy 232 and the shadow copy 234, for example, by saving the local copy 232 elsewhere on user computer 220 and copying the shadow copy 234 as the new local copy 232. The user interface may also be a more complex interface, as described in the related application listed above.

In one embodiment, checks are made to ensure that no local change has been made when the file is in the current state 300 or the rollback available state 320, and to ensure that the upload of the diff file was successful. If these checks fail, a modified state 310 or conflicted state 330 should result.

Rollback Version

Another option available to the user is when the versioning state is rollback available 320 or modified 310. A user interface will then be available to the user which will allow them to roll back to the version of the document previously viewed or edited by the user, which is stored in rollback copy 238.

In one embodiment, the user interface is displayed to the user, indicating that the document has been updated by another user. The user interface allows the user to select the previous version, stored in the rollback copy 238, or to view the differences between the previous version, stored in the rollback copy 238, and the current version, stored in local copy 232.

Figure 4:
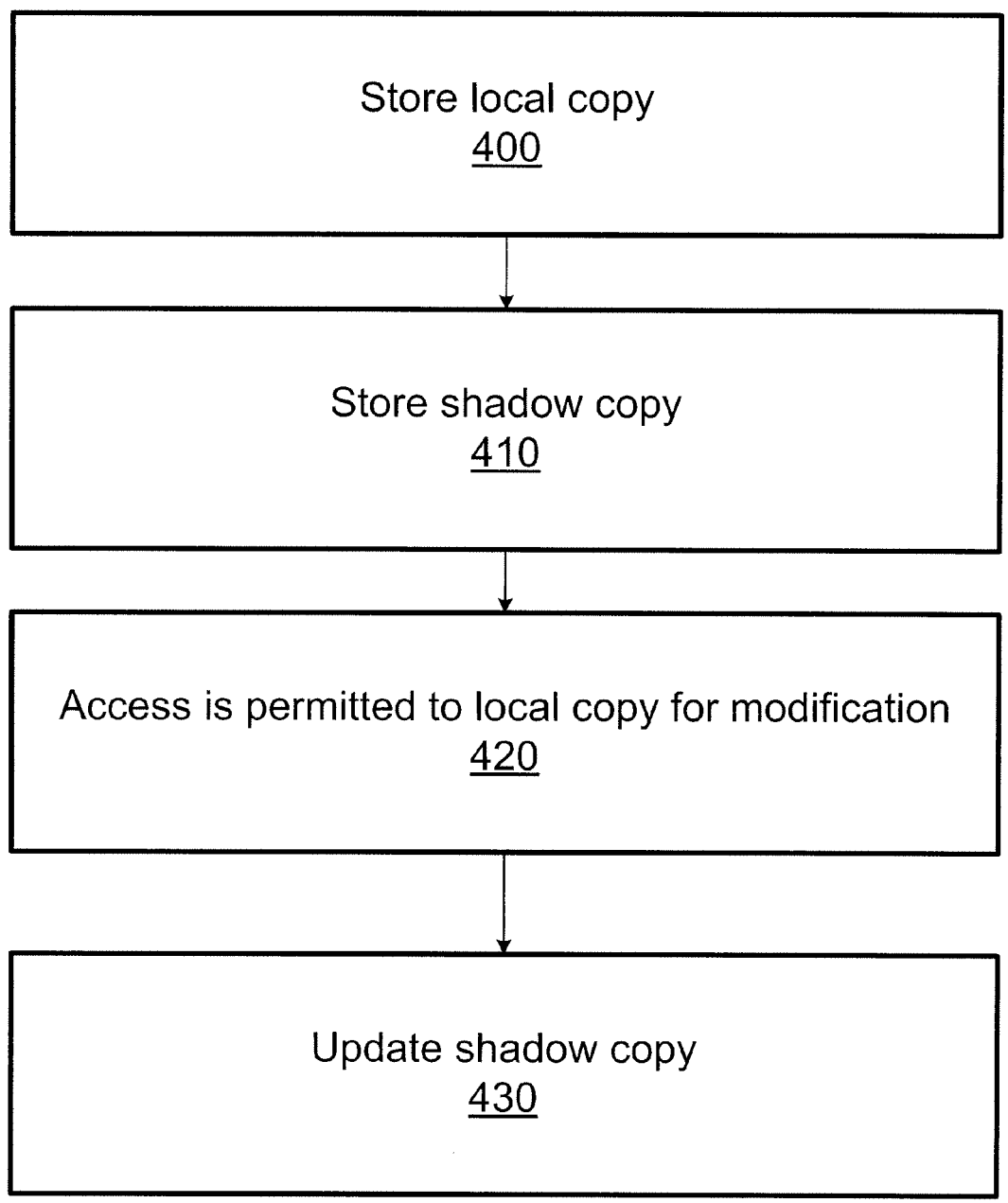
FIG. 4 is a flowchart showing file replication in accordance with an embodiment of the invention.
Figure 5:
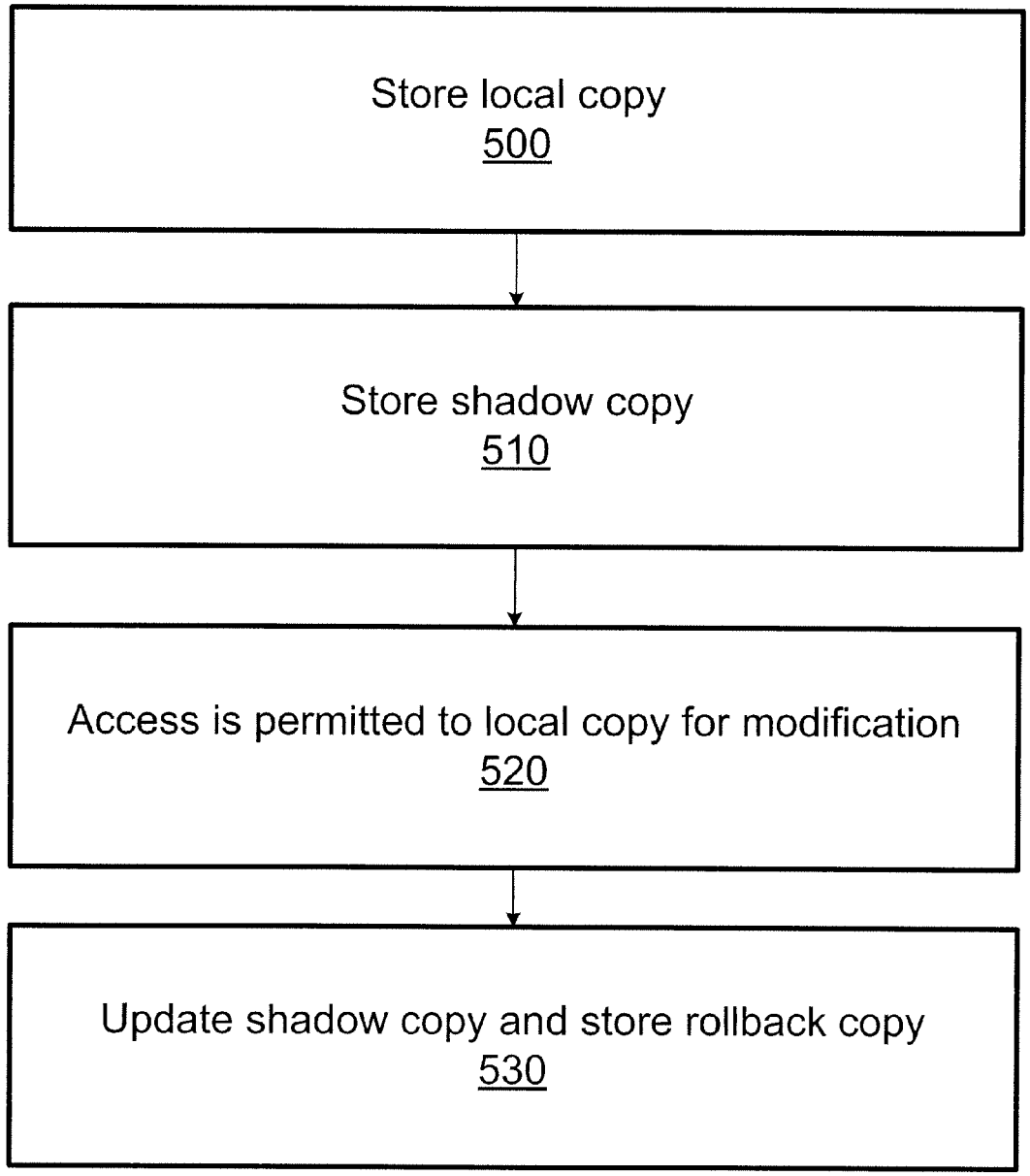
FIG. 5 is a flowchart showing file replication in accordance with an embodiment of the invention.

The rollback copy is only present in some embodiments of the invention. As shown in FIG. 4, file replication of a server file occurs on a user computer according when a local copy is stored (step 400) and a shadow copy is stored (step 410). Access is permitted to the local copy for modification (step 420). In some embodiments, this is done through a namespace copy of the local copy. When the user computer is connected to the server computer and the master file changes, then the shadow copy is updated (step 430). In one embodiment, versioning states are tracked for the replication.

Where the rollback copy is kept, as shown in FIG. 5, again, file replication of a server file occurs on a user computer according when a local copy is stored (step 500) and a shadow copy is stored (step 510). Access is permitted to the local copy for modification (step 520). When the user computer is connected to the server computer and the master file changes, then the shadow copy is updated (step 530). In this step, when the shadow copy is updated, the rollback copy is also updated, if necessary. First, the local copy is stored as the rollback copy, and the local copy is then updated with the shadow copy. In one embodiment, this is done only if the local copy has been accessed since the previous rollback.

The file replication manager 220 may be a separate application or may be wholly or partially integrated into the application used with the file being replicated.

CONCLUSION

As mentioned above, while exemplary embodiments of the present invention have been described in connection with various computing devices and network architectures, the underlying concepts may be applied to any computing device or system in which it is desirable to implement collaboration via server. Thus, the methods and systems of the present invention may be applied to a variety of applications and devices. While exemplary programming languages, names and examples are chosen herein as representative of various choices, these languages, names and examples are not intended to be limiting. One of ordinary skill in the art will appreciate that there are numerous ways of providing object code that achieves the same, similar or equivalent systems and methods achieved by the invention.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the signal processing services of the present invention, e.g., through the use of a data processing API or the like, are preferably implemented in a high level procedural or object oriented programming language to communicate with a computer. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, or a receiving machine having the signal processing capabilities as described in exemplary embodiments above becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating therefrom. Furthermore, it should be emphasized that a variety of computer platforms, including handheld device operating systems and other application specific operating systems are contemplated, especially as the number of wireless networked devices continues to proliferate. Therefore, the present invention should not be limited to any single embodiment, but rather should be construed in breadth and scope in accordance with the appended claims.

What is claimed:

1. A method for file replication of a master file on a first computer accessible by a plurality of other computers, comprising:
    replicating a local copy of said master file and an accompanying shadow copy of said master file on each of at least several of the plurality of other computers;
    permitting access to each local copy for modification; and
    updating each shadow copy when said master file changes.
2. The method of claim 1, where said method further comprises:
    storing a versioning state associated with said replication, and where said step of permitting access to said local copy for modification comprises:
    changing said versioning state when said local copy is modified.
3. The method of claim 2, where said step of changing said versioning state when said local copy is modified comprises:
    setting said versioning state to a modified state indicating that said local copy has been modified.

4. The method of claim 1, where said method further comprises:
  storing a versioning state associated with said replication;
  and where said step of updating said shadow copy when said master file changes comprises:
  changing said versioning state when said updating occurs.

5. The method of claim 1, where said step of updating said shadow copy when said master file changes comprises:
  detecting that said local copy has been modified; and
  resolving conflicts between said local copy and said updated shadow copy.

6. The method of claim 5, where said method further comprises:
  storing a versioning state associated with said replication;
  and where said step of resolving conflicts between said local copy and said updated shadow copy comprises:
  changing said versioning state to a conflicted state indicating that a conflict exits.

7. The method of claim 5, where said step of resolving conflicts between said local copy and said updated shadow copy comprises:
  presenting a conflict interface;
  accepting a conflict resolution command; and
  implementing said conflict resolution command.

8. The method of claim 7, where said implementation of conflict resolution commands comprises:
  determining if a change should be made to said master file; and
  communicating said change to be made to said first computer.

9. The method of claim 8, where said step of communicating said change to be made to said first computer comprises:
  generating difference information regarding differences between said local copy and said master file; and
  communicating said difference information to said master file.

10. The method of claim 1, where said step of updating said shadow copy when said master file changes comprises:
  storing said local copy as a rollback copy; and
  updating said local copy with said shadow copy.

11. The method of claim 10, where said step of storing said local copy as a rollback copy comprises:
  presenting a rollback interface;
  accepting a rollback command; and
  displaying said rollback copy in response to said rollback command.

12. The method of claim 10, where said method further comprises:
  storing a versioning state associated with said replication;
  and where said step of storing said local copy as a rollback copy comprises:
  changing said versioning state to a rollback available state.

13. The method of claim 10, further comprising:
  tracking whether the local copy has been accessed since a previous rollback;
  and where said step of storing said local copy as a rollback copy comprises:
  storing said local copy as a rollback copy only if said local copy has been accessed since the previous rollback.

14. A system for replication of a master file, the system comprising a first computer and a plurality of other computers, said master file located on the first computer, said first computer at least intermittently operably connected to the plurality of other computers, each of at least several of the plurality of other computers comprising:
  local copy storage for storing a local copy of said master file;
  shadow copy storage for storing a shadow copy of said master file;
  a local copy modification module for permitting access to said local copy for modification; and
  a shadow copy updating module for updating said shadow copy storage when said master file changes.

15. The system of claim 14, at least a subset of the plurality of other computers further comprising:
  versioning state storage for storing a versioning state associated with said replication,
  and where said local copy modification module changes said versioning state when said local copy is modified.

16. The system of claim 15, where said local copy modification module sets said versioning state to a modified state indicating that said local copy has been modified.

17. The system of claim 14, where the at least a subset of the plurality of other computers further comprises:
  versioning state storage for storing a versioning state associated with said replication;
  and where said shadow copy updating module changing said versioning state when said updating occurs.

18. The system of claim 14, where shadow copy updating module comprises:
  local copy modification detection module for detecting that said local copy has been modified; and
  conflict resolution module for resolving conflicts between said local copy and said updated shadow copy.

19. The system of claim 18, where the at least a subset of the plurality of other computers further comprises:
  versioning state storage for storing a versioning state associated with said replication;
  and said conflict resolution module changes said versioning state to a conflicted state indicating that a conflict exits.

20. The system of claim 18, where said conflict resolution module comprises:
  conflict interface module for presenting a conflict interface;
  conflict resolution input module for accepting a conflict resolution command; and
  conflict resolution implementation for implementing said conflict resolution command.

21. The system of claim 20, where said conflict resolution implementation comprises:
  change determination module for determining if a change should be made to said master file; and
  first computer change communication module for communicating said change to be made to said first computer.

22. The system of claim 21, where said first computer change communication module comprises:
  difference generation module for generating difference information regarding differences between said local copy and said master file; and
  first computer communication module for communicating said difference information to said master file.

23. The system of claim 14, where said shadow copy updating module comprises:
  rollback storage for storing said local copy as a rollback copy; and
  local copy update module for updating said local copy with said shadow copy.

24. The system of claim 23, where said local copy update module comprises:
  a rollback interface presentation module presenting a rollback interface;
  rollback command acceptance module accepting a rollback command; and rollback copy display for displaying said rollback copy in response to said rollback command.

25. The system of claim 23, where at least a subset of the plurality of other computers further comprises:
versioning state storage for storing a versioning state associated with said replication;
and where said rollback storage changes said versioning state to a rollback available state.

26. The system of claim 23, at least a subset of the plurality of other computers further comprising:
local copy access tracking module for tracking whether the local copy has been accessed;
and where said rollback storage for storing said local copy as a rollback copy comprises:
local copy access logic for storing said local copy as a rollback copy only if said local copy has been accessed.

27. A method for replicating a master file on a server processor onto a plurality of client processors, the method comprising:
storing a local copy of the master file on each of the plurality of client processors;
storing a shadow copy of the master file on each of the plurality of client processors;
permitting each of the plurality of client processors to access their local copy for modification;
updating the shadow copy on each of the plurality of client processors when the master file changes, wherein the updated shadow copy is indicative of a most recent version of the master file on the server processor by, the step of updating the shadow copy on each of the plurality of client processors comprising:
storing a local copy as a rollback copy only if the local copy has been
accessed since a previous rollback; and
updating the local copy with the shadow copy; and
generating versioning states indicative of versions of each of the master file, the plurality of local copies, and the plurality of shadow copies;
storing the generated versioning states; and
utilizing the stored versioning states to determine a current state of at least one of the master file, a local copy, and a shadow copy.

* * * * *